United States Patent
Tamborini et al.

(10) Patent No.: US 8,337,136 B2
(45) Date of Patent: Dec. 25, 2012

(54) DEVICE FOR SUPPORTING AND MOVING SHELVES FOR CAGES FOR LABORATORY ANIMALS

(75) Inventors: Paolo Tamborini, Cardano Al Campo (IT); Giovanni Malnati, Malnate (IT)

(73) Assignee: Tecniplast S.p.A., Buguggiate (IT)

( * ) Notice: Subject to any disclaimer, the term of this patent is extended or adjusted under 35 U.S.C. 154(b) by 757 days.

(21) Appl. No.: 12/366,167

(22) Filed: Feb. 5, 2009

(65) Prior Publication Data

US 2010/0111657 A1 May 6, 2010

(30) Foreign Application Priority Data

Oct. 30, 2008 (IT) .......................... MI2008A001916

(51) Int. Cl.
*B60P 3/00* (2006.01)
(52) U.S. Cl. ...................................................... 414/458
(58) Field of Classification Search ............. 414/331.03, 414/331.14, 458; 280/47.131, 47.24
See application file for complete search history.

(56) References Cited

U.S. PATENT DOCUMENTS

| | | | | |
|---|---|---|---|---|
| 3,486,650 A | * | 12/1969 | Boone | 414/458 |
| 4,528,941 A | * | 7/1985 | Spengler | 119/418 |
| 4,921,264 A | * | 5/1990 | Duffy | 280/79.11 |
| 4,934,893 A | * | 6/1990 | Johnson | 414/458 |
| 5,716,186 A | * | 2/1998 | Jensen et al. | 414/458 |
| 5,782,600 A | * | 7/1998 | Walsh | 414/490 |
| 5,996,535 A | | 12/1999 | Semenuk et al. | |
| 6,308,660 B1 | | 10/2001 | Coiro, Sr. et al. | |
| 6,553,939 B1 | | 4/2003 | Austin et al. | |
| 7,487,744 B1 | * | 2/2009 | Goldberg et al. | 119/453 |
| 2003/0051676 A1 | | 3/2003 | Rivard | |
| 2006/0285959 A1 | * | 12/2006 | Warhurst | 414/540 |
| 2007/0194546 A1 | * | 8/2007 | Cozza | 280/47.131 |

FOREIGN PATENT DOCUMENTS

| | | |
|---|---|---|
| EP | 1719406 | 11/2006 |
| WO | WO0124618 | 4/2001 |
| WO | WO03096801 | 11/2003 |

* cited by examiner

*Primary Examiner* — Joshua Rudawitz
(74) *Attorney, Agent, or Firm* — LeClairRyan, a Professional Corporation

(57) ABSTRACT

A device for lifting and moving shelves, in particular shelves for cages for laboratory animals, said device comprising: means for lifting at least one shelf, and for keeping it lifted from the ground; moving means to allow displacement of the device in the presence of a shelf lifted from the ground, along at least one direction. Structure comprising several devices as described above, engaged with a driving system to allow translation along a common direction.

10 Claims, 3 Drawing Sheets

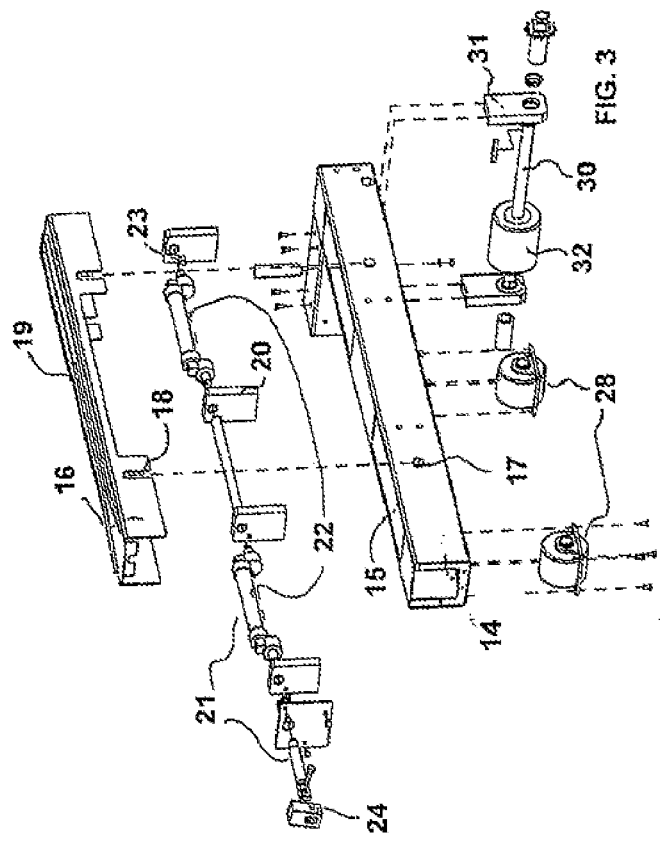
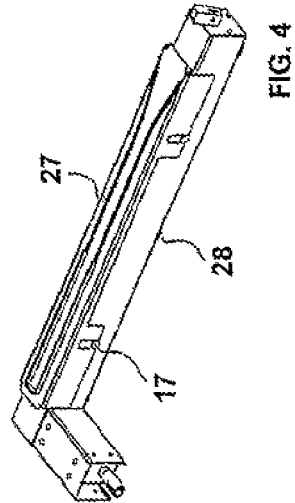
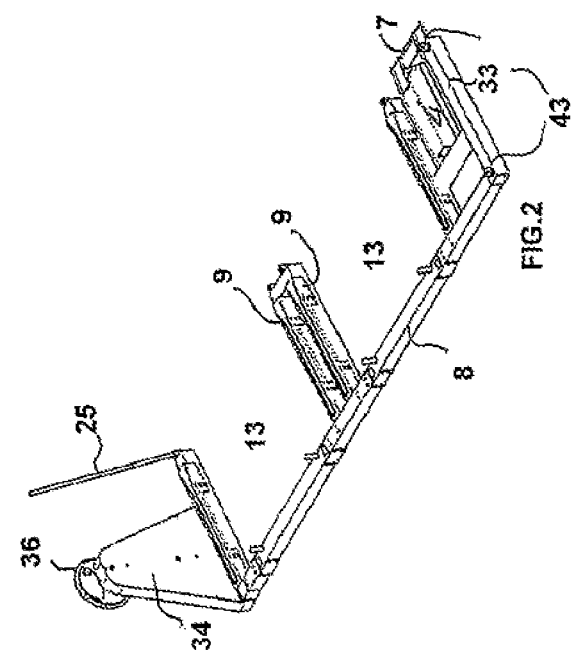
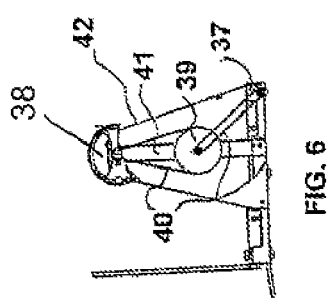
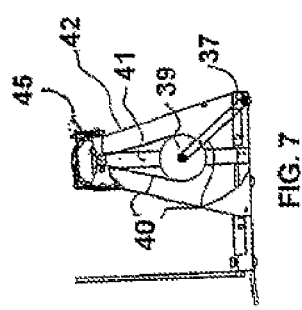

DEVICE FOR SUPPORTING AND MOVING SHELVES FOR CAGES FOR LABORATORY ANIMALS

The present invention relates to an apparatus and to a method for changing the cage of laboratory animals.

BACKGROUND

In the field of laboratory animal management, in particular with small animals such as mice or guinea pigs, cages are used, in particular sealed cages suitable to be connected to a ventilation system. The cages are usually housed side by side and stacked on shelves constructed for this purpose, each in a specific seat provided with guides suitable to receive and support the cage; the shelf can be accessible from two opposite sides, allowing two sets of cages to be housed. Each shelf can house several tens of cages, for example eighty cages, and is provided with circulation systems to connect the cages to a ventilation unit. Usually the cages are connected automatically to said systems as soon as the cage is inserted in the seat. The operator can connect the circulation systems of the various shelves which are mutually served by a single unit.

A large number of shelves can be present in laboratories and to optimize the space they can be placed side by side, in contact or almost with one another so that, to access the cages it is necessary to move the shelves to create a passage between two adjacent shelves, i.e. placed with the long sides, those accessible, against one another. Displacement takes place transversely to the long side of the shelf, and the shelves can be moved in sequence, to free from time to time the space between two pairs of subsequent shelves and access all the cages for the operations, similarly to the case of archives with moving shelves. The shelves are generally provided with their own wheels, for example wheels free to swivel in the direction in which the shelf is pushed, so that they can be moved in all directions, and not in transverse direction, so that they can also be moved out of the formation. Given the considerably weight that a shelf can have when loaded with cages, movement is difficult and tiring. Moreover, the wheels can damage the floor on which they rest and move.

The problem is further increased by the fact that more than one shelf, for example two, can be mutually aligned, mechanically joined and connected to the same ventilation unit, so that it is necessary to move them together, and together with the unit serving them, an operation that is considerably difficult and made even more difficult by the elasticity of the structure of the shelf.

SUMMARY

The problems set forth above have now been solved through a device for lifting and moving shelves, in particular shelves for cages for laboratory animals, said device comprising:

means for lifting at least one shelf, preferably more than one shelf and for keeping them lifted from the ground;

moving means to allow displacement of the device in the presence of a shelf lifted from the ground, along at least one direction.

Preferably the apparatus can lift a shelf provided with wheels, so as to lift these from the ground.

According to an aspect of the invention, said moving means comprise wheels or preferably rolls, which allow movement along a direction, transverse with respect to the accessible sides of the shelf or shelves. More preferably, said moving means comprise an entrainment system which, according to an aspect of the invention, can be operated manually or by means of an engine, for example an electric engine, which causes rotation of the wheels or rolls and translation of the device. This system can comprise a demultiplying mechanism to facilitate translation, loading or unloading of the device.

According to another preferred aspect, the device can support and move two mutually aligned shelves and, preferably, can also support a ventilation unit.

The invention relates in particular to the content of the appended claims.

BRIEF DESCRIPTION OF THE DRAWINGS

The present invention will now be illustrated through the detailed description of preferred, but not exclusive, embodiments provided purely by way of example, with the aid of the accompanying drawings, wherein:

FIG. 2 schematically represents a perspective view of the device of FIG. 1 without shelves and ventilation unit;

FIG. 3 schematically represents an exploded view of an arm of the unit above;

FIG. 4 schematically represents a detail of the device with said arm assembled;

FIG. 6 schematically represents a detail of the device, in particular part of a manual entrainment system;

FIG. 7 schematically represents a detail of the device, in particular part of an entrainment system with engine.

DETAILED DESCRIPTION

Figure 1:
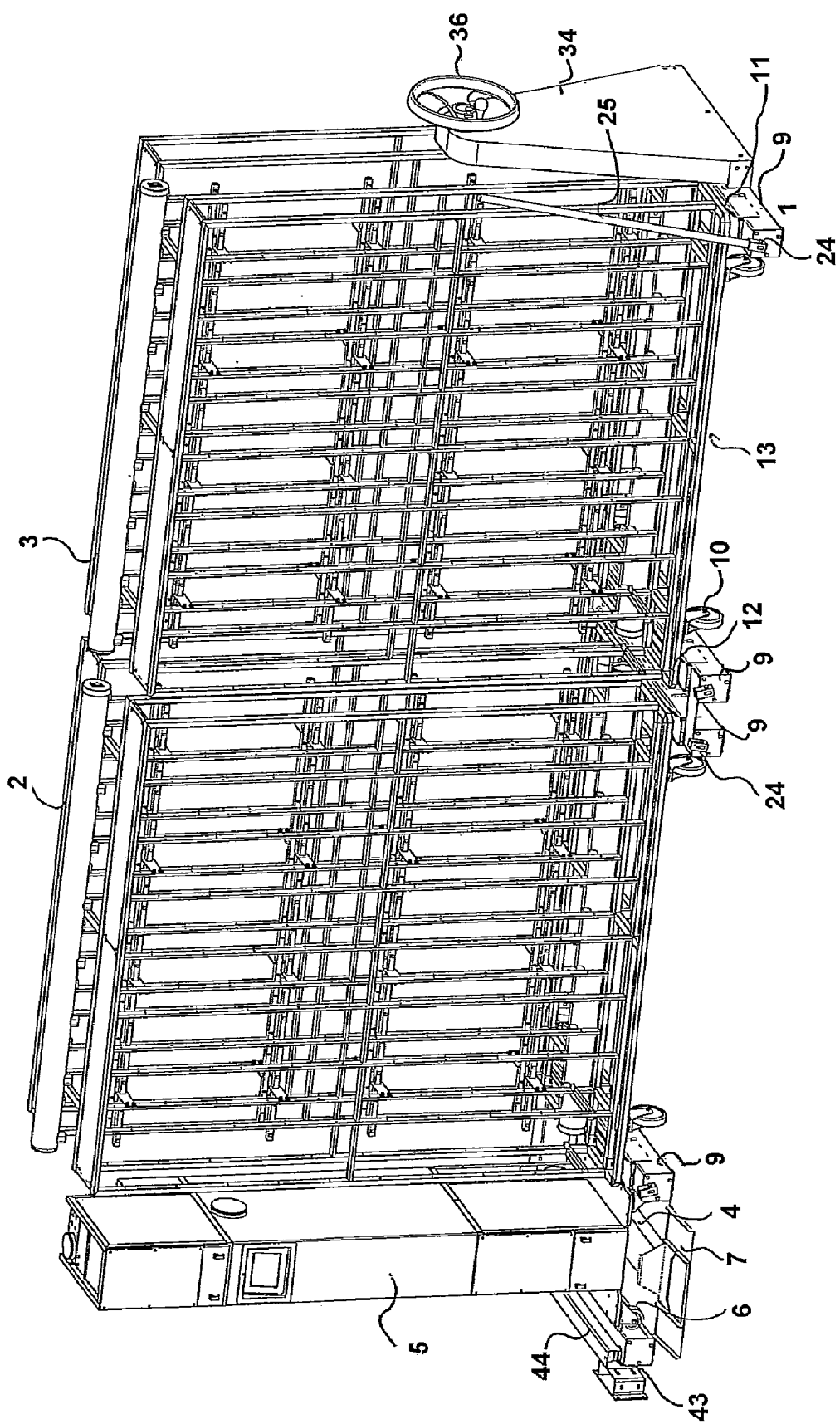
FIG. 1 schematically represents a perspective view of a device according to an aspect of the invention, with two shelves and one ventilation unit.

FIGS. 1 and 2 schematically represent a device 1 according to the invention to lift and support two shelves 2 and 3 provided with wheels. The device also supports a ventilation unit 5, to feed, by means of connections of a known type, the cages present on the shelves.

For the ventilation unit, according to an aspect of the invention, given the relatively small overall dimensions and weight of the unit, it is deemed sufficient to provide a seat 4 in the device, in which the unit can be placed. If the unit, as in the case represented, is provided with wheels 6, the seat is structured so that the unit can be placed simply by pushing it thereon, making use of these wheels. It can be provided with grooves or similar elements to receive the wheels of the unit, and prevent movement thereof once the unit has been placed in the seat.

According to an aspect of the invention a mobile element 7 can be present, for example hinged at the seat, moving between a lowered position, shown, in which it acts as guide for the wheels of the unit 5, when this is positioned on the device or removed therefrom, and a lifted position, in which, besides reducing the overall dimensions of the device it can be useful to hold the unit 5 on the seat 4.

According to an embodiment, the device presents a cross element 8 of appropriate length which connects a series of arms 9, at least two, one of which can be connected directly with the seat to receive the ventilation unit. Defined between the arms and the cross element is at least one space 13, preferably at least two, which can be rectangular in shape, to house the wheels 10 of a shelf. The shelf, positioned in the space, is located with the ends 11 and 12 placed above two arms. In this case the ends of the shelf, viewed in the plane, projects beyond the wheels. Other configurations would also be possible, for example wherein at least one arm can be positioned under the shelf and in a position between the wheels of the shelf.

According to an aspect of the invention, the means to lift the shelves are integrated in the arms. They can be displaced between two configurations, in one of which the shelf rests on the ground on its wheels, while in the second they lift the shelf. It must be borne in mind that the shelves can be very heavy, so that the lifting means must allow this operation to take place without excessive effort by the operator.

In the exploded view of FIG. 3 and in FIG. 4, the structure of one of the arms can be observed. It comprises a boxed section 14, substantially a section bar of appropriate structure, which can be connected with the cross element. At the top the box section presents one or more openings 15, and positioned above the box section is the mobile element, which can be a section bar with a U-shaped section, free to translate vertically on the box section. Guide elements can be present; for example the pins 17 on the box section, which engage with corresponding grooves 18 on the mobile element, in order to allow vertical translation, keeping the mobile element in the correct position. The mobile element can be lifted above the box section coming into contact, with the upper face 19, with the lower part of the shelf, to lift it.

Inside the box section, and supported thereby, for example by means of supports 20 fastened thereto, there can be present a shaft 21, provided with eccentric portions 22. Partial rotation of the shaft in one direction will cause the eccentric portions to project from the openings 15 of the box section, determining lifting of the mobile element, while rotation in the opposite direction will cause their retraction inside the box section with consequent lowering of the mobile element.

Figure 5:
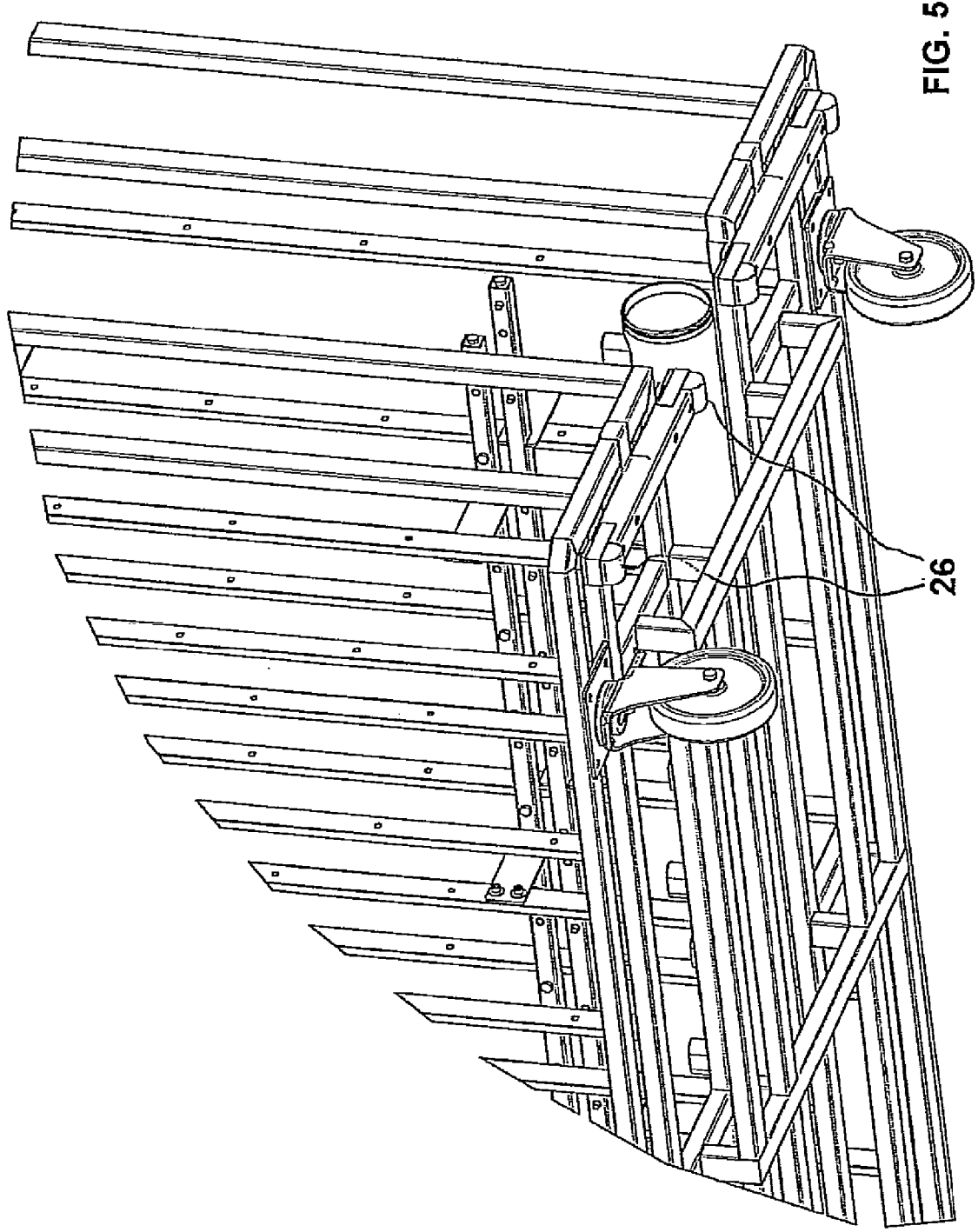
FIG. 5 schematically represents a detail of a shelf which can be lifted with the device according to the invention, in particular the lower part of one end.

Stop elements, such as the pins 23 which interfere with the eccentric portion, allow travel of the shaft to be appropriately limited. For example, during lifting the eccentric portion can be allowed to slightly exceed the top dead centre, so that the weight of the lifted shelf blocks the mechanism. To lower the shelf it will be necessary to overcome the force necessary to return the eccentric portion to the top dead centre, and then the weight itself can cause lowering. In the lowered position, a stop element can be used to position the shaft in a manner that allows easy access to a system for engaging with manual means to make the shaft rotate. The engaging system can be produced as follows: at one end of the shaft, accessible from the outside of the box section, for example projecting therefrom, a coupling means 24 can be fixed integrally to engage with a lever 25, for example a sleeve fixed to the shaft in a known manner, as can also be seen in FIG. 1. The lever can be inserted to perform the rotation and then removed. It is evident from FIG. 1 that, by positioning the shelf on the device, it is necessary, according to the aspect of the invention represented, to lift both ends with the means provided on two different arms. As lifting by a few millimetres is sufficient, such as to lift the wheels of the shelf, it is possible to lift the two ends at different times, without this causing any drawbacks. The upper surface of the mobile elements can engage with the lower face of the shelf. Given the weight of the shelf, friction is generally sufficient to keep the shelf in position. However, anti-slip means can be provided, such as ridges or projections on the surface of the mobile elements to engage with the part of the shelf involved. Guide means can also be provided, capable of guiding the shelf when the mobile elements are lowered. Inserts or elements of appropriate material can be provided, which can be interposed between surface and shelf. Interposing elements 26 are represented in FIG. 5, for example made of plastic material, appropriately fixed to the bottom of the shelf, which can cooperate with the ridges 27 of the surfaces 19 of the mobile elements (FIG. 4), shaped as longitudinal guides. With lifting the interposing elements will transmit the force between shelf and mobile element.

The device comprises moving means to allow translation on the floor, preferably as stated in a direction transverse to the shelf or shelves, intending therewith transversely to the sides of the shelves accessible for inserting or removing the cages. In the case illustrated, this is the direction coinciding with the longitudinal dimension of the arms 9. These can be wheels or, preferably, rolls, more suitable for translation in only one direction, guaranteeing a more ample line of contact with the floor, which is advantageous with regard to weight distribution and thus reducing wear to the floor in the case of the same movements always being performed. The rolls 28 can be revolvingly fixed to the bottom of the arms in a known manner and to the cross element; they can be mounted substantially inside the cross element or the arms, projecting towards the ground by a few mm. Preferably, at least part of the rolls, indicated with the reference 32, is connected appropriately to a manual entrainment system. According to an advantageous embodiment, the rolls supported by the cross element are mounted integral to a single driving shaft 30 disposed parallel to the cross element, preferably contained therein, which advantageously has the structure of a section bar, or more than one section bar appropriately joined. The driving shaft can be supported revolvingly in a known manner on the cross element by means of supports 31 fixed thereto. The entrainment system thus entrains the driving shaft 30 in rotation, causing translation of the device resting on the floor. Rolls can also be provided in another part of the device, for example in the longitudinal member 33 which delimits, with one of the arms and the cross element, the seat for the ventilation unit.

The entrainment system can comprise the structure 34, preferable placed at one end of the device, preferably the end opposite the ventilation unit, which can comprise a manual control 35, for example a steering wheel 36, connected, preferably by means of a demultiplying mechanism, to the end of the driving shaft. As can be seen from FIG. 6, the mechanism can comprise a first gear 37 placed at the end of the driving shaft, a second gear 38, integral to the steering wheel, a pair of gear wheels of different diameter integral to each other, each connected to one of the two gears by means of the chains 40. By turning the steering wheel the device is made to translate.

The entrainment system can also be an engine, for example an electric engine, indicated with 45 in FIG. 7, which can have a control that allows actuation in one direction or in the other. Those skilled in the art will be able to produce an appropriate ratio between the revolutions of the steering wheel and that of the driving shaft. The gears, the wheels and the steering wheel can be supported by an upright 41 in an appropriate manner and a casing 42 can cover chains and gears.

Appropriate driving systems can also be present, to guarantee movement of the devices along the desired direction. For example, from the opposite part with respect to the manual control, an element 43, for example a pin or roll, can be provided to engage with a rail 44, disposed parallel to the direction of translation of the device, which can be fixed to a wall or the like. The rail can serve a series of devices disposed parallel to support several shelves in a laboratory. In this manner, with translation of the devices a passage can be created from time to time between two adjacent devices to access the shelves, similarly to the case of an archive with moving walls.

The invention also relates to a structure comprising several devices as described above and a driving system with which said devices are engaged, so as to be able to translate along the same direction.

The device can easily be produced by those skilled in the art with known means.

The device allows easy movement of the shelves, even of more than one shelf, preferably two, together with the ventilation unit, in the manner desired, without the known problems related to the weight of the shelves, to the fact that they are normally provided with wheels suitable for another type of movement, without the need to modify shelves already commercially available.

Other variants to the above can be devised.

What is claimed is:

1. A apparatus for lifting and moving shelves, n particular shelves for cages for laboratory animals, said apparatus comprising:
 a lifting assembly configured to lift at least a shelf, and for keeping it lifted from the ground; and
 a moving device to allow the displacement of the apparatus in the presence of a shelf lifted from the ground, along at least one direction, wherein said moving device can translate said apparatus into one direction and comprise wheels or rolls, and said moving device comprise an entrainment system which can be operated manually or by an engine acting on at least a part of said wheels or rolls, and wherein said system comprises a driving shaft integral to at least a part of said wheels or rolls and connected by a demultiplying mechanism to a manual drive or to an electric engine.

2. The apparatus according to claim 1 wherein the lifting assembly is suitable to lift two mutually aligned shelves.

3. The apparatus according to claim 2 wherein the lifting assembly is suitable to lift shelves provided with wheels.

4. The apparatus according to claim 3, further comprising a seat to house a ventilation unit with or without wheels for said shelves.

5. The apparatus according to claim 4, wherein said manual control is placed at one end of the cross element and said seat for housing the ventilation unit is placed at the opposite end.

6. The apparatus according to claim 1, comprising a cross element to which arms are connected which can be positioned below the ends of a shelf, each said arm comprising said lifting assembly.

7. The apparatus according to claim 6, further comprising a mobile element to contact the lower part of the shelf, said mobile element being placed above said arm, and a shaft provided with eccentric portions to push upwards said element by a rotation of the shaft, or to allow the mobile element to fall by an opposite rotation.

8. The apparatus according to claim 6, wherein said driving shaft is housed in said cross element.

9. The apparatus according to claim 1, wherein said shaft is manually operable by a removable lever.

10. The apparatus according to claim 1, comprising an element to engage a rail which is parallel to a translation direction of the apparatus.

* * * * *